April 15, 1924.

F. B. CROSBY

MOTOR CONTROL

Filed Sept. 5, 1919

1,490,733

Inventor:
Fred B. Crosby,
by *Albert G. Davis*
His Attorney.

Patented Apr. 15, 1924.

1,490,733

UNITED STATES PATENT OFFICE.

FRED B. CROSBY, OF WORCESTER, MASSACHUSETTS, ASSIGNOR TO GENERAL ELECTRIC COMPANY, A CORPORATION OF NEW YORK.

MOTOR CONTROL.

Application filed September 5, 1919. Serial No. 321,883.

*To all whom it may concern:*

Be it known that I, FRED B. CROSBY, a citizen of the United States, residing at Worcester, in the county of Worcester, State of Massachusetts, have invented certain new and useful Improvements in Motor Controls, of which the following is a specification.

My invention relates to improvements whereby a predetermined relationship between the speeds of two separately driven mechanically independent elements of separate machines, or elements of the same machine, my be effected and be automatically maintained.

By means of my invention, two separately driven mechanically independent machines may be located at a considerable distance from each other and a fixed relation between the speeds of the two machines may be established at will, and after the relation is established it will be automatically maintained, or such a result may be obtained with elements of the same machine which are separately driven and mechanically independent.

Figure 1:
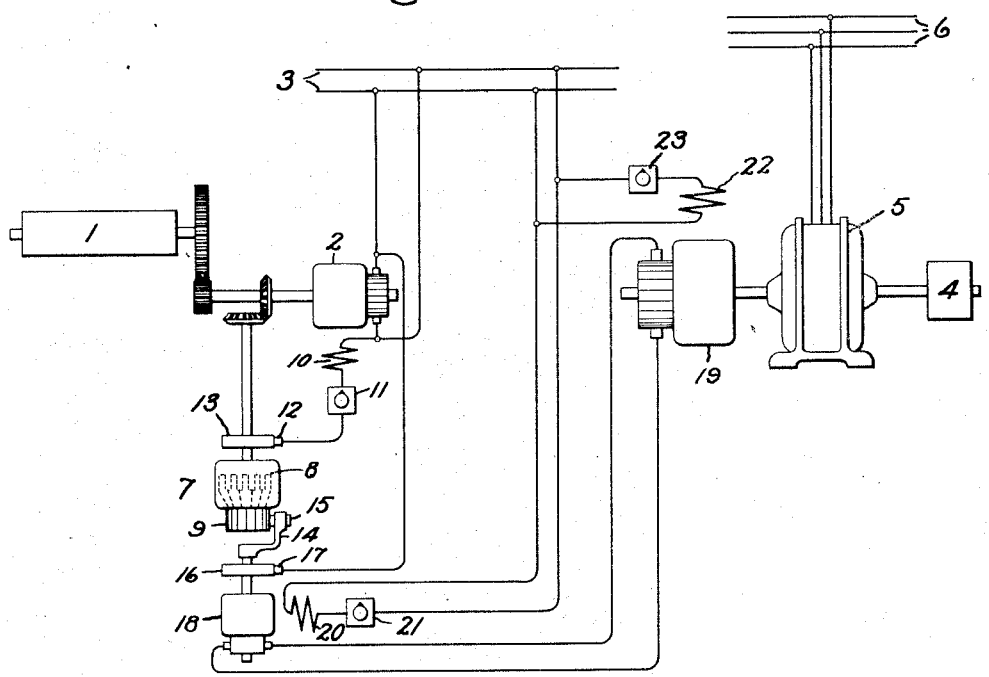
Figure 2:
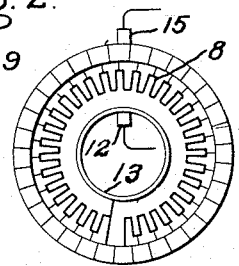

For a better understanding of my invention, reference is had to the accompanying drawing in which Figure 1 shows an embodiment of my invention in the control of two separate machines, each of which is driven by a separate electric motor, and Fig. 2 is a diagrammatic representation of a part of the rheostat for controlling the speed of one of the machines.

Referring to Fig. 1, the roll 1 of one of the driven parts of one machine is driven by means of the direct current electric motor 2, which receives energy from a source of supply 3. The roll 4, one of the driven parts of a second mechanically independent machine, is driven by means of an electric motor 5 of the induction type, which receives energy from a source of alternating current 6. Synchronously operated with the electric motor 2 by means of the bevel gearing shown, is a part of the speed regulator motor controlling rheostat 7, which is adapted to vary the speed of the motor 2 so as to preserve a predetermined relationship between the speeds of the rolls 1 and 4. This rheostat 7 is provided with a resistance 8, which has connected thereto conductors leading to bars on a commutator 9, the arrangement being such that the value of the resistance included between any two adjacent segments of the commutator is substantially the same as that between any other two adjacent segments. The rheostat is inserted in the circuit of the shunt field 10 of the electric motor 2, the shunt field being energized through a circuit including the manually operated rheostat 11, the brush 12 which is adapted to bear upon and make electric engagement with a rotatable ring 13 of conducting material, a part or all of resistance 8, the rotatable commutator 9, a rotatable contact member 14 having a brush 15 adapted to bear upon the commutator 9 and make electrical engagement therewith, the rotatable conducting ring 16 and a brush of conducting material 17 bearing upon the ring 16 and making electrical contact therewith. The contact member 14 is arranged for relative rotation with the commutator 9 and the position of the contact member with respect to the commutator determines the value of the resistance 8, which is included in the shunt field of the motor 2. The rotatable contact member 14 is driven at a speed proportional to the speed of the roll 4, by means of an electric motor 18, the armature circuit of which is energized by current received from a direct current generator 19 driven by the motor 5. The electric motor 18 is of the shunt type and has its shunt field 20 energized from the source of supply 3 through a circuit including the manually operated rheostat 21. The generator 19 is also of the shunt type and has its field 22 energized from the source of supply 3 through a circuit including the manually operated rheostat 23.

The resistance 8 and commutator 9 of the rheostat 7 are rotated at a speed proportional to the speed of the driving motor 2 and the roll 1 of the driven machine by means of the beveled gearing, and the electric motor 18 rotates the contact member 14 at a speed proportional to the roll 4 driven by the electric motor 5. As long as the commutator 9 of the rheostat and the contact arm 14 are rotated at the same speed, the resistance 8 in the circuit of the shunt field 10 of motor 2 will not be altered, but in case the speed of the motor 2 varies from the fixed relation there will be a relative movement between the commutator 9 and the contact arm 14 and more or less of the resistance 8 will be included in the shunt field 10 of motor 2, thereby varying the speed of the motor 2 so as to maintain the proportionate relationship between the speeds of the two machines.

As thus constructed and arranged, the operation of my invention is as follows: Let it be assumed that the driving motors 2 and 5 are connected to their respective sources of supply and are operating their respective machines, and that it is desired to establish a certain relation between the speeds of the machines of 1 and 4. By means of the arrangement shown, a relation between the speeds of the two machines will be preserved, since in case there is a difference between the speed of the commutator 9 of the rheostat 7 and the rotating contact member 14, the resistance 8 will be varied so that the speed of the electric motor 2 is either increased or decreased so that the commutator 9 will be caused to rotate at the same speed as the rotating contact member 14. If it is desired to alter this relation between the speeds of the two machines and to have another predetermined relation between the speeds of the machines automatically maintained, the manually operated rheostats 23, 21 and 11 may be adjusted at will while the machines are operating so that the voltage of the generator 19, the speed of the electric motor 18, and the speed of the electric motor 2 will be such that the new relation between the speeds of the two machines is established. After this relation has been established, it will be automatically maintained by the rheostat 7.

In accordance with the provisions of the patent statutes, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States, is:—

1. The combination with a machine element and means for driving the same, of a second machine element mechanically independent thereof arranged to be operated at various speeds, an electric driving motor for the second machine element, means for causing the second machine element to operate at a speed proportional to that of the first machine element, comprising a speed regulating rheostat for the said driving motor, the said rheostat having a rotatable resistance element and a rotatable contact element for varying the effective resistance of the rheostat, one of said rheostat elements being connected to be driven responsively to the speed of one of said machine elements, an electric motor for operating the other of said rotatable elements, and means for varying the voltage impressed on the operating motor responsively to the speed of the other of said machine elements, whereby upon a variation in speed of the two machine elements from a proportional relation, a relative movement is imparted to the said elements of the speed regulator to reestablish the predetermined relation between the speeds of said machine elements.

2. The combination with a machine element and means for driving the same, of a second machine element mechanically independent thereof arranged to be operated at various speeds, an electric driving motor for the second machine element, means for causing the second machine element to operate at a speed proportional to that of the first machine element, comprising a rheostat for varying the speed of the driving motor, the said rheostat having a rotatable resistance element driven responsively to the speed of the driving motor and a rotatable contact member for varying the effective resistance of the rheostat, an electric motor for operating the said contact member, and means for varying the voltage impressed on the motor operating the contact member responsively to the speed of the first machine element, whereby upon a variation in speed of the two machine elements from a predetermined proportional relation the said contact member will be rotated to correspondingly vary the effective resistance of the said rheostat to reestablish the predetermined relation between the speeds of the said machine elements.

3. The combination with a machine element and means for driving the same, of a second machine element mechanically independent thereof arranged to be operated at various speeds, an electric driving motor for the second machine element, means for causing the second machine element to operate at a speed proportional to that of the first machine element, comprising a speed regulating rheostat for the said driving motor, the said rheostat having a rotatable resistance element and a rotatable contact element for varying the effective resistance of the rheostat, one of said rheostat elements being connected to be driven responsively to the speed of one of said machine elements, an electric motor for operating the other of said rotatable elements, means for varying the voltage impressed on the operating motor responsively to the speed of the other of said machine elements, and means for independently varying the voltage impressed on the operating motor for establishing at will a new proportional relation between the speeds of said machine elements.

In witness whereof, I have hereunto set my hand this seventh day of August, 1919.

FRED B. CROSBY.